United States Patent [19]

Tomizawa et al.

[11] Patent Number: 5,266,229
[45] Date of Patent: Nov. 30, 1993

[54] STABLE ELECTRO-RHEOLOGICAL FLUID HAVING A HIGH VISCOSITY-INCREASING EFFECT

[75] Inventors: Hirotaka Tomizawa; Makoto Kanbara; Narihiko Yoshimura; Junichi Mitsui; Hiroshi Hirano, all of Saitama, Japan

[73] Assignee: Tonen Corporation, Japan

[21] Appl. No.: 714,900

[22] Filed: Jun. 14, 1991

Related U.S. Application Data

[63] Continuation-in-part of Ser. No. 350,618, May 11, 1989, abandoned.

[30] Foreign Application Priority Data

| May 12, 1988 | [JP] | Japan | 63-113600 |
| May 12, 1988 | [JP] | Japan | 63-113601 |
| May 12, 1988 | [JP] | Japan | 63-113602 |
| Sep. 28, 1988 | [JP] | Japan | 63-240897 |

[51] Int. Cl.$^5$ ............... C10M 171/00; C10M 169/04
[52] U.S. Cl. .................. 252/73; 252/74; 252/75; 252/77; 252/78.1; 252/572
[58] Field of Search ............ 252/572, 73, 74, 75, 252/77, 78.1

[56] References Cited

U.S. PATENT DOCUMENTS

| 3,047,507 | 7/1962 | Winslow | 252/75 |
| 3,367,872 | 2/1968 | Martinek et al. | 252/74 |
| 3,427,247 | 2/1969 | Peck | 252/75 |
| 3,970,573 | 7/1976 | Westhaver | 252/75 |
| 4,299,714 | 11/1981 | Sugiura et al. | 252/73 |
| 4,668,417 | 5/1987 | Goosens et al. | 252/75 |
| 4,687,589 | 8/1987 | Block | 252/73 |
| 4,744,914 | 5/1988 | Filisko et al. | 252/74 |

FOREIGN PATENT DOCUMENTS

| 726156 | 4/1980 | U.S.S.R. |
| 1076754 | 7/1967 | United Kingdom |

OTHER PUBLICATIONS

"Lubricant Additives", Smalheer et al, 1967.
052663036 Matsepuro, "Structure Formation in an Electric Field and the Composition of Electrorheological Suspensions", Royal Aircraft Establishment, Jul. 1983.

*Primary Examiner*—Christine Skane
*Attorney, Agent, or Firm*—Wegner, Cantor, Mueller & Player

[57] ABSTRACT

An electro-rheological fluid comprising an electrically insulating liquid as the dispersion medium, porous solid particles as the dispersed phase, a dispersant, and a polyhydric alcohol having a boiling point of not lower than 250° C., a melting point of not higher than 15° C. and a viscosity of not higher than 300 cp (as measured at 20° C.), or comprising an electrically insulating liquid as the dispersion medium, porous solid particles as the dispersed phase, a polyhydric alcohol and/or water, and an ashless dispersant.

11 Claims, No Drawings

STABLE ELECTRO-RHEOLOGICAL FLUID HAVING A HIGH VISCOSITY-INCREASING EFFECT

This is a continuation-in-part of application Ser. No. 07/350,618 filed May 11, 1989, now abandoned.

BACKGROUND OF THE INVENTION

1. Field of the Invention

The present invention relates to an electro-rheological fluid, the viscosity of which can be controlled by application of an electric field. More particularly, the present invention relates to an electro-rheological liquid in which the viscosity is changed promptly and reversibly following the application of an electric field over a broad temperature range of from low temperatures to high temperatures, and which is stable for a long time and has a high viscosity-increasing effect.

2. Description of the Related Art

An electro-rheological fluid (also called "electroviscous fluid" and abbreviated to ER fluid), the viscosity of which is changed by application of an electric field, is well known; the ER fluid was discovered at the end of the 19th century [Duff, A.W., Physical Review, Vol. 4, No. 1, 23 (1986)].

Initial investigations concerning ER fluids were directed to a system composed solely of a liquid, and the effect was unsatisfactory, but then the investigations were turned toward a fluid of the solid dispersion system and a considerable improvement was obtained. For example, Winslow proposed an ER fluid comprising paraffin and silica gel powder, in which water is incorporated to render the system slightly electroconductive [Winslow, W.H., J. of Applied Physics, Vol. 20, 1137 (1949)]. Due to this study by Winslow, the electro-viscous effect possessed by the ER fluid is called an ER effect or Winslow effect.

The mechanism of a manifestation of the viscosity-increasing effect (ER effect) has been further elucidated and, for example, Klass explains that respective particles constituting the dispersed phase of the fluid cause an induced polarization of the double layer in the electric field, and that this is the main cause of the ER effect [Klass, D.L., et al., J. of Applied Physics, Vol. 38, 67 (1967)].

This will now be described with reference to the electric double layer. If the electric field is zero (E=0), the ion absorbed on the periphery of the dispersed phase (silica gel or the like) is uniformly arranged on the outer surface of the dispersed phase, but if the electric field (E) is a definite value, polarization occurs in the ion distribution and the respective particles impart an electrostatic action to one another in the electric field, and thus the respective particles of the dispersed phase form a bridge (cross-linkage) and the shear-resistant force to an external stress, i.e., the ER effect, is manifested.

In the above-mentioned ER fluid of the solid particle dispersion system, various proposals have been made for improving the viscosity characteristics and stability of the ER fluid while taking the mechanism of the manifestation of the ER effect into consideration. For example, the use of a ferroelectric powder and a fine powder of silicon dioxide having a small amount of water adsorbed therein (Japanese Unexamined Patent Publication No. 53-17585), the use of a high-molecular-weight dispersant having a functional group for stabilizing a dispersion system comprising a silica gel containing 1 to 15% by weight of water as the dispersed phase and a silicone oil as the liquid phase (Japanese Unexamined Patent Publication No. 61-44998), and an addition of a water-soluble electrolyte to a cellulose crystallite aggregate as the dispersed phase (Japanese Examined Patent Publication No. 57-47234), have been proposed.

Above-mentioned ER fluids still have unsatisfactory results for reversible change response upon application of an electric field, reproducibility of the ER effect, degree of the viscosity-increasing effect, and maintenance of the stable ER effect for a long time.

SUMMARY OF THE INVENTION

A primary object of the present invention is to provide an electro-rheological fluid having a good responsitivity in the prompt and reversible change of the viscosity upon application of an electric field, and an excellent reproducibility of the ER effect, in which the ER effect can be stably maintained for a long time.

In accordance with one feature of the present invention, there is provided an electro-rheological fluid comprising an electrically insulating liquid as the dispersion medium, porous solid particles as the dispersed phase, a dispersant, and a polyhydric alcohol having a boiling point of not lower than 250° C., a melting point of not higher than 15° C. and a viscosity of not higher than 300 cp (as measured at 20° C.).

In accordance with another feature of the present invention, there is provided an electro-rheological fluid comprising an electrically insulating liquid as the dispersion medium, porous solid particles as the dispersed phase, a polyhydric alcohol and/or water, and an ashless dispersant.

DESCRIPTION OF THE PREFERRED EMBODIMENTS

The kind of electrically insulating liquid used as the dispersion medium in the present invention is not particularly critical, and any electrically insulating liquid having an electrically insulating property can be used. For example, mineral oils and synthetic lubricating oils can be used as the electrically insulating liquid of this type.

More specifically, there can be mentioned a mineral oil, aromatic, paraffinic and naphthenic hydrocarbons, a poly-α-olefin, a polyalkylene glycol, a silicone, a diester, a polyol ester, a phosphoric acid ester, a silicon compound, a halogenated aromatic liquid, a polyphenyl ether, and a synthetic hydrocarbon. Preferably, the viscosity of the electrically insulating liquid used is 5 to 300 cp as measured at 40° C.

The kind of porous solid particle used as the distributed phase of the ER fluid of the present invention is not particularly critical, and any porous solid particles utilized in this field can be used.

As the porous solid particle of this type, there can be mentioned silica gel, a hydrous resin, diatomaceous earth, alumina, silica-alumina, a zeolite, an ion exchange resin and a cellulose.

Preferably, porous solid particles having a particle size of 10 nm to 200 μm are used in an amount of 0.1 to 50% by weight. If the amount of the porous solid particles is smaller than 0.1% by weight, the ER effect is low, and if the amount of the porous solid particle is larger than 50% by weight, the dispersibility is often unsatisfactory.

In the ER fluid of the present invention, by making a polyhydric alcohol present together with water or in the absence of water, an excellent ER effect can be manifested at high temperatures (for example, temperature higher than 80° C.). Dihydric alcohols and trihydric alcohols are suitably used as the polyhydric alcohol in the present invention. For example, ethylene glycol, glycerol, propane diol, butane diol, hexane diol, diethylene glycol, triethylene glycol, tetraethylene glycol, pentaethylene glycol, hexaethylene glycol, heptaethylene glycol, and tripropylene glycol can be used. It has been unexpectedly found that polyhydric alcohols having a boiling point of not lower than 250° C., a melting point of not higher than 15° C. and a viscosity of not higher than 300 cp (as measured at 20° C.), such as triethylene glycol, tetraethylene glycol, pentaethylene glycol, hexaethylene glycol, heptaethylene glycol and tripropylene glycol, can be advantageously used, since they prevent a loss of the ER fluid by evaporation, ensure the stable dispersion of the solid particles, and do not affect the viscosity of the ER fluid. Water, a polyhydric alcohol or a mixture thereof is preferably used in an amount of 1 to 30% by weight, especially 2 to 15% by weight, based on the porous solid particles. If the amount of this member is smaller than 1% by weight, the ER effect is low, and if the amount of this member in larger than 30% by weight, an electric current is likely to flow in the fluid.

In the present invention, a dispersant can be used for uniformalizing and stabilizing the dispersion state of the porous solid particles in the dispersion medium, and dispersants customarily used in this field can be used. Examples of the dispersant may include non-ionic dispersants, for example, sulfonates such as magnesium sulfonate and calcium sulfonate, phenates such as calcium phenate, phosphonates such as barium phosphonate, fatty acid esters such as sorbitol mono-oleate, sorbitol sesqui-oleate and glyceryl mono-oleate. However, where water or a polyhydric alcohol other than those having a melting point of not higher than 15° C. and a viscosity of not higher than 300 cp (as measured at 20° C.) is made present in the ER fluid, there can be particularly advantageously used ashless dispersants including alkenyl succinimides such as polyisobutenyl succinimide and derivatives thereof, hydroxybenzylamines, alkenyl succinates, and polar monomer-containing polymethacrylates. It has further been found that the presence of the ashless dispersant notably improve the dispersion stability of the solid particled in the resulting fluid. The dispersant is preferably used in an amount of 0.1 to 10% by weight.

More specifically, the alkenyl succinimides may be represented by the following formulae:

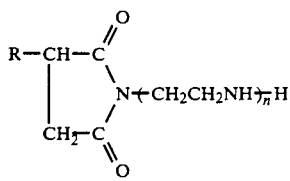

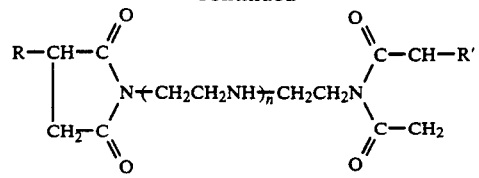

in which R and R' independently represent alkenyl, and n is an integer of 1-20, preferably 3-10, the molecular weight being 100-100,000, preferably 500-10,000. Functional derivatives of the alkenyl succinimides may also be useful.

The hydroxybenzylamines may be represented by the following formula:

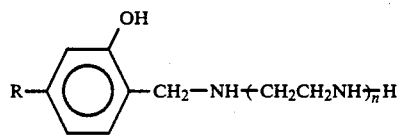

in which R represents hydrogen or alkenyl, and n is an integer of 0-20, preferably 1-10.

The alkenyl succinates may be represented by the following formula:

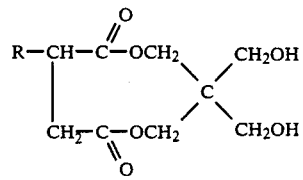

in which R represents alkenyl.

The polar monomer-containing polymethacrylates may be represented by the following formula:

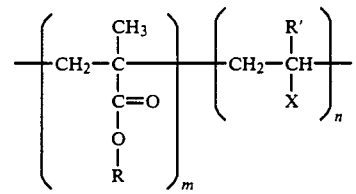

in which R represents $C_{1-18}$ alkyl, R' represents hydrogen or methyl, X represents a polar group such as an amine, amide, nitryl or carboxyl group, the molecular weight being 5,000-2,000,000, preferably 20,000-1,500,000.

The ER fluid of the present invention may further comprise at least one member selected from the group consisting of acids, bases and salts. The presence of this member can stably improve the viscosity-increasing effect of the resulting ER fluid.

As the acid, there can be used, for example, inorganic acids such as sulfuric acid, hydrochloric acid, nitric acid, perchloric acid, chromic acid, phosphoric acid and boric acid, and organic acids such as acetic acid, formic acid, propionic acid, butyric acid, isobutyric acid, valeric acid, oxalic acid and malonic acid.

As the base, there can be used, for example, hydroxides of alkali metals and alkaline earth metals, carbonates of alkali metals, and amines. Bases which are dissolved and dissociated in water, a polyhydric alcohol or a mixture thereof are preferably used.

As specific examples of the base of this type, there can be used NaOH, KOH, Ca(OH)$_2$, Na$_2$CO$_3$NaHCO$_3$, K$_3$PO$_4$, Na$_3$PO$_4$, aniline, an alkylamine and ethanolamine.

The salt used in the present invention is a compound comprising a metal or basic group (NH$_4$+ or N$_2$H$_5$+)and an acid group. Salts which are dissolved and dissociated in water, a polyhydric alcohol or a mixture thereof are preferably used. For example, there can be mentioned salts forming a typical ion crystal, such as halides of alkali metals and alkaline earth metals, and alkali metal salts of organic acids. As specific examples of the salt of this type, LiCl, NaCl, KCl, MgCl$_2$, CaCl$_2$, BaCl$_2$, LiBr, NaBr, KBr, MgBr, LiI, NaI, KI, AgNO$_3$, Ca(NO$_3$)$_2$, NaNO$_2$, NH$_4$NO$_3$, K$_2$SO$_4$, Na$_2$SO$_4$, NaHSO$_4$, (NH$_4$)$_2$SO$_4$, and alkali metal salts of formic acid, acetic acid, oxalic acid and succinic acid.

Preferably, this member is used in an amount of 0.01 to 5% by weight, especially 0.1 to 2% by weight, based on the entire fluid. If the amount of this member is smaller than 0.01% by weight, the ER effect may be unsatisfactory, and if the amount of this member exceeds 5% by weight, an electric current may be likely to flow in the fluid and thus the power consumption increased.

In the ER fluid of the present invention having the above-mentioned construction, the viscosity is changed promptly and reversibly following an application of an electric field over a broad temperature range of from low temperatures to high temperatures, the ER fluid of the present invention is stable for a long time, and a high viscosity-increasing effect is attained.

The present invention will now be described in detail with reference to the following examples, but the scope of the present invention is not limited by these examples.

EXAMPLES 1-28 and COMPARATIVE EXAMPLES 1-3

(i) Preparation of ER Fluid

A dispersion medium, solid particles, water or a polyhydric alcohol, a dispersant, and, optionally, an acid, base or salt as shown in Table 1 were thoroughly stirred and mixed, in the respective amounts as shown in Table 1, to obtain an ER fluid. The silica gel as used had an average diameter of 1 μm.

(ii) Experimental Conditions and Items of Evaluation of ER Fluids

The ER fluids were maintained at 40° C., and the ER fluids were evaluated with respect to the following items, by using a rotational viscometer where an application of a voltage was possible.

(a) Reproducibility

The cycle of the change of the electric field of 0→E (V/m)→0 was repeated, and the reproducibility was evaluated based on the ratio (%) of the change of the viscosity at the electrical field of E (V/m).

(b) Stability

An electrical field of E (V/m) was constantly applied, and the ratio (%) of the change of the viscosity with a lapse of time was measured, to evaluate the stability (the measurement time was 1 hour).

(c) Viscosity-increasing Effect

The viscosity-increasing effect was evaluated based on the ratio (times) of the viscosity at an electrical field of E (V/m) to the viscosity at an electrical field of 0 (V/m).

(d) Sedimentation Ratio

The sedimentation ratio was evaluated based on the volume (%) of the sediments after allowing the fluid to stand for 7 days at room temperature.

(e) Durability

The durability was evaluated based on the ratio (%) of the viscosity change with time measured over 5 hours at a constant AC field of 2.0×10$^6$ (V/m).

(iii) The results are shown in Table 2.

TABLE 1

| | Dispersion Medium | | Solid Particles | | Water/Polyhydric Alcohol | | Dispersant | | Acid, Base/Salt | |
|---|---|---|---|---|---|---|---|---|---|---|
| | Type | wt % | Type | wt % | Type | wt % | Type | wt % | Type | wt % |
| Example 1 | Mineral oil | 89.0 | Silica gel | 6.0 | Water | 1.0 | Polyisobutenyl succinimide A | 4.0 | — | — |
| Example 2 | Mineral oil | 89.6 | Silica | 6.0 | Ethylene glycol | 0.4 | Polyisobutenyl succinimide A | 4.0 | — | — |
| Example 3 | Mineral oil | 89.6 | Silica gel | 6.0 | Ethylene glycol | 0.4 | Alkenyl hydroxy-benzylamine | 4.0 | — | — |
| Example 4 | Mineral oil | 89.6 | Silica gel | 6.0 | Ethylene glycol | 0.4 | Alkenyl succinate | 4.0 | — | — |
| Example 5 | Mineral oil | 89.6 | Silica gel | 6.0 | Ethylene glycol | 0.4 | Disperse type polymethacrylate | 4.0 | — | — |
| Example 6 | Alkylbenzene | 89.6 | Silica gel | 6.0 | Ethylene glycol | 0.4 | Polyisobutenyl succinimide A | 4.0 | — | — |
| Example 7 | Mineral oil | 87.6 | Silica gel | 6.0 | Ethylene glycol | 0.4 | Polyisobutency succinimide A | 4.0 | Acetic acid | 0.4 |
| Example 8 | Mineral oil | 88.0 | Silica gel | 6.0 | Triethylene glycol | 2.0 | Glyceryl mono-oleate | 4.0 | — | — |
| Example 9 | Mineral oil | 87.6 | Silica gel | 6.0 | Triethylene glycol | 2.0 | Glyceryl mono-oleate | 4.0 | Acetic acid | 0.4 |
| Example 10 | Mineral oil | 87.6 | Silica gel | 6.0 | Triethylene glycol | 2.0 | Glyceryl mono-oleate | 4.0 | NaI | 0.4 |
| Example 11 | Mineral oil | 87.8 | Silica gel | 6.0 | Triethylene glycol | 2.0 | Glyceryl mono-oleate | 4.0 | NaOH | 0.2 |
| Example 12 | Alkylbenzene | 88.0 | Silica | 6.0 | Triethylene glycol | 2.0 | Glyceryl mono- | 4.0 | — | — |

TABLE 1-continued

| | Dispersion Medium | | Solid Particles | | Water/Polyhydric Alcohol | | Dispersant | | Acid, Base/Salt | |
|---|---|---|---|---|---|---|---|---|---|---|
| | Type | wt % | Type | wt % | Type | wt % | Type | wt % | Type | wt % |
| Example 13 | Mineral oil | 88.0 | Silica gel | 6.0 | Tetraethylene glycol | 2.0 | Glyceryl mono-oleate | 4.0 | — | — |
| Example 14 | Mineral oil | 88.0 | Silica gel | 6.0 | Pentaethylene glycol | 2.0 | Glyceryl mono-oleate | 4.0 | — | — |
| Example 15 | Mineral oil | 88.0 | Silica gel | 6.0 | Hexaethylene glycol | 2.0 | Glyceryl mono-oleate | 4.0 | — | — |
| Example 16 | Mineral oil | 88.0 | Silica gel | 6.0 | Heptaethylene glycol | 2.0 | Glyceryl mono-oleate | 4.0 | — | — |
| Example 17 | Mineral oil | 88.0 | Silica gel | 6.0 | Tripropylene glycol | 2.0 | Glyceryl mono-oleate | 4.0 | — | — |
| Example 18 | Mineral oil | 88.0 | Silica gel | 6.0 | Triethylene glycol | 2.0 | Polyisobutenyl succinimide A | 4.0 | — | — |
| Example 19 | Mineral oil | 88.0 | Silica gel | 6.0 | Triethylene glycol | 2.0 | Alkenyl hydroxy-benzylamine | 4.0 | — | — |
| Example 20 | Mineral oil | 88.0 | SIlica gel | 6.0 | Triethylene glycol | 2.0 | Alkenyl succinate | 4.0 | — | — |
| Example 21 | Mineral oil | 88.0 | Silica gel | 6.0 | Triethylene glycol | 2.0 | Disperse type polymethacrylate | 4.0 | — | — |
| Example 22 | Alkylbenzene | 88.0 | Silica gel | 6.0 | Triethylene glycol | 2.0 | Polyisobutenyl succinimide A | 4.0 | — | — |
| Example 23 | Mineral oil | 88.0 | Silica gel | 6.0 | triethylene glycol | 2.0 | Polyisobutenyl succinimide B | 4.0 | — | — |
| Example 24 | Mineral oil | 88.0 | Silica gel | 6.0 | Tetraethylene glycol | 2.0 | Polyisobutenyl succinimide A | 4.0 | — | — |
| Example 25 | Mineral oil | 88.0 | Silica gel | 6.0 | Pentaethylene glycol | 2.0 | Polyisobutenyl succinimide A | 4.0 | — | — |
| Example 26 | Mineral oil | 88.0 | Silica gel | 6.0 | Hexaethylene glycol | 2.0 | Polyisobutenyl succinimide A | 4.0 | — | — |
| Example 27 | Mineral oil | 88.0 | Silica gel | 6.0 | Heptaethylene glycol | 2.0 | Polyisobutenyl succinimide A | 4.0 | — | — |
| Example 28 | Mineral oil | 88.0 | Silica gel | 6.0 | Tripropylene glycol | 2.0 | Polyisobutenyl succinimide A | 4.0 | — | — |
| Comparative Example 1 | Mineral oil | 88.0 | Silica gel | 6.0 | Glycerol | 2.0 | Glycerol mono-oleate | 4.0 | — | — |
| Comparative Example 2 | Mineral oil | 89.6 | Silica gel | 6.0 | Ethylene glycol | 0.4 | Glycerol mono-oleate | 4.0 | — | — |
| Comparative Example 3 | Mineral oil | 89.2 | Silica gel | 6.0 | Ethylene glycol | 0.4 | Glycerol mono-oleate | 4.0 | Acetic acid | 0.4 |

TABLE 2

| | Temperature (°C.) | Electrical Field Strength E (V/m) | Shear Rate (1/sec) | Reproducibility (%) | Stability (%) | Viscosity-Increasing Effect (times) | Sedimentation Ratio (%) | Durability (%) |
|---|---|---|---|---|---|---|---|---|
| Example 1 | 40 | $1.4 \times 10^6$ | 200 | ±8 | ±5 | 2.0 | 1 | 100 |
| | 90 | $1.4 \times 10^6$ | 200 | ±12 | ±10 | 2.0 | | 80 |
| Example 2 | 40 | $1.4 \times 10^6$ | 200 | ±5 | ±4 | 2.2 | 1 | 100 |
| | 90 | $1.4 \times 10^6$ | 200 | ±5 | ±4 | 2.1 | | 92 |
| Example 3 | 40 | $1.4 \times 10^6$ | 200 | ±5 | ±4 | 2.3 | 2 | 100 |
| | 90 | $1.4 \times 10^6$ | 200 | ±5 | ±5 | 2.1 | | 90 |
| Example 4 | 40 | $1.4 \times 10^6$ | 200 | ±5 | ±5 | 2.0 | 1 | 100 |
| | 90 | $1.4 \times 10^6$ | 200 | ±5 | ±5 | 2.2 | | 90 |
| Example 5 | 40 | $1.4 \times 10^6$ | 200 | ±7 | ±7 | 2.0 | 2 | 100 |
| | 90 | $1.4 \times 10^6$ | 200 | ±7 | ±9 | 2.0 | | 90 |
| Example 6 | 40 | $1.4 \times 10^6$ | 200 | ±3 | ±2 | 3.1 | 1 | 100 |
| | 90 | $1.4 \times 10^6$ | 200 | ±5 | ±2 | 4.2 | | 90 |
| Example 7 | 40 | $1.4 \times 10^6$ | 200 | ±2 | ±2 | 4.0 | 1 | 100 |
| | 90 | $1.4 \times 10^6$ | 200 | ±2 | ±2 | 3.8 | | 92 |
| Example 8 | 40 | $2.0 \times 10^6$ | 600 | ±6 | ±4 | 3.5 | 10 | 100 |
| | 90 | $2.0 \times 10^6$ | 600 | ±6 | ±4 | 11.2 | | 97 |
| Example 9 | 40 | $2.0 \times 10^6$ | 600 | ±3 | ±2 | 4.0 | 8 | 100 |
| | 90 | $2.0 \times 10^6$ | 600 | ±3 | ±2 | 14.0 | | 95 |
| Example 10 | 40 | $2.0 \times 10^6$ | 600 | ±3 | ±2 | 3.7 | 8 | 100 |
| | 90 | $2.0 \times 10^6$ | 600 | ±3 | ±2 | 11.8 | | 97 |
| Example 11 | 40 | $2.0 \times 10^6$ | 600 | ±3 | ±2 | 3.9 | 10 | 100 |
| | 90 | $2.0 \times 10^6$ | 600 | ±3 | ±2 | 12.1 | | 97 |
| Example 12 | 40 | $2.0 \times 10^6$ | 600 | ±3 | ±2 | 3.8 | 9 | 100 |
| | 90 | $2.0 \times 10^6$ | 600 | ±3 | ±2 | 12.0 | | 98 |
| Example 13 | 40 | $2.0 \times 10^6$ | 600 | ±6 | ±5 | 3.3 | 9 | 100 |
| | 90 | $2.0 \times 10^6$ | 600 | ±6 | ±5 | 10.5 | | 98 |
| Example 14 | 40 | $2.0 \times 10^6$ | 600 | ±6 | ±5 | 3.4 | 8 | 100 |
| | 90 | $2.0 \times 10^6$ | 600 | ±6 | ±5 | 10.8 | | 98 |
| Example 15 | 40 | $2.0 \times 10^6$ | 600 | ±6 | ±5 | 3.0 | 9 | 100 |
| | 90 | $2.0 \times 10^6$ | 600 | ±6 | ±5 | 10.3 | | 98 |
| Example 16 | 40 | $2.0 \times 10^6$ | 600 | ±6 | ±5 | 2.9 | 8 | 100 |

TABLE 2-continued

| | Temperature (°C.) | Electrical Field Strength E (V/m) | Shear Rate (1/sec) | Reproducibility (%) | Stability (%) | Viscosity-Increasing Effect (times) | Sedimentation Ratio (%) | Durability (%) |
|---|---|---|---|---|---|---|---|---|
| | 90 | 2.0 × 10⁶ | 600 | ±6 | ±5 | 10.8 | | 98 |
| Example 17 | 40 | 2.0 × 10⁶ | 600 | ±5 | ±4 | 3.3 | 8 | 100 |
| | 90 | 2.0 × 10⁶ | 600 | ±5 | ±4 | 10.5 | | 97 |
| Example 18 | 40 | 2.0 × 10⁶ | 600 | ±4 | ±2 | 3.5 | 3 | 100 |
| | 90 | 2.0 × 10⁶ | 600 | ±4 | ±2 | 11.2 | | 97 |
| Example 19 | 40 | 2.0 × 10⁶ | 600 | ±4 | ±3 | 3.3 | 3 | 100 |
| | 90 | 2.0 × 10⁶ | 600 | ±4 | ±3 | 10.3 | | 98 |
| Example 20 | 40 | 2.0 × 10⁶ | 600 | ±4 | ±2 | 3.4 | 3 | 100 |
| | 90 | 2.0 × 10⁶ | 600 | ±4 | ±3 | 11.0 | | 98 |
| Example 21 | 40 | 2.0 × 10⁶ | 600 | ±5 | ±3 | 3.0 | 5 | 100 |
| | 90 | 2.0 × 10⁶ | 600 | ±6 | ±5 | 9.8 | | 95 |
| Example 22 | 40 | 2.0 × 10⁶ | 600 | ±3 | ±2 | 3.8 | 2 | 100 |
| | 90 | 2.0 × 10⁶ | 600 | ±3 | ±2 | 12.0 | | 98 |
| Example 23 | 40 | 2.0 × 10⁶ | 600 | ±4 | ±2 | 3.3 | 3 | 100 |
| | 90 | 2.0 × 10⁶ | 600 | ±4 | ±2 | 10.5 | | 98 |
| Example 24 | 40 | 2.0 × 10⁶ | 600 | ±4 | ±2 | 3.3 | 2 | 100 |
| | 90 | 2.0 × 10⁶ | 600 | ±4 | ±2 | 10.5 | | 98 |
| Example 25 | 40 | 2.0 × 10⁶ | 600 | ±4 | ±2 | 3.4 | 2 | 100 |
| | 90 | 2.0 × 10⁶ | 600 | ±4 | ±2 | 10.8 | | 98 |
| Example 26 | 40 | 2.0 × 10⁶ | 600 | ±6 | ±3 | 3.0 | 3 | 100 |
| | 90 | 2.0 × 10⁶ | 600 | ±6 | ±4 | 10.3 | | 98 |
| Example 27 | 40 | 2.0 × 10⁶ | 600 | ±6 | ±3 | 2.9 | 3 | 100 |
| | 90 | 2.0 × 10⁶ | 600 | ±6 | ±4 | 10.8 | | 98 |
| Example 28 | 40 | 2.0 × 10⁶ | 600 | ±4 | ±2 | 3.3 | 3 | 100 |
| | 90 | 2.0 × 10⁶ | 600 | ±4 | ±2 | 10.5 | | 97 |
| Comparative Example 1 | 40 | 2.0 × 10⁶ | 600 | ±8 | ±10 | 2.5 | 13 | 100 |
| | 90 | 2.0 × 10⁶ | 600 | ±12 | ±13 | 7.1 | | 96 |
| Comparative Example 2 | 40 | 1.4 × 10⁶ | 200 | ±8 | ±10 | 2.0 | 9 | 100 |
| | 90 | 1.4 × 10⁶ | 200 | ±10 | ±10 | 1.9 | | 90 |
| Comparative Example 3 | 40 | 1.4 × 10⁶ | 200 | ±7 | ±8 | 3.2 | 11 | 100 |
| | 90 | 1.4 × 10⁶ | 200 | ±9 | ±8 | 3.5 | | 88 |

The dispersants as used are as follows:

Polyisobutenyl succinimide A is sold under the trademark ECA 4360J, manufactured by Exxon Chemical Co.;

Polyisobutenyl succinimide B is sold under the trademark OLOA 1200, manufactured by Karonite Chemical Co.;

Alkenyl hydroxybenzylamine is sold under the trademark Amoco 9250, manufactured by Amoco Co.;

Alkenyl succinate is sold under the trademark Lubrizol 936 from Nippon Lubrizol Co.; and, Dispersant type polymethacrylate (i.e., polar monomer-containing polymethacrylate) is sold under the trademark Viscoplex 5061, manufactured by Rohm.

We claim:

1. An electro-rheological fluid comprising an electrically insulating liquid as the dispersion medium, porous solid particles as the dispersed phase, an ashless dispersant in an amount of 0.1 to 10% by weight based on a the entire fluid, and a polyhydric alcohol having a boiling point of not lower than 250° C., a melting point of not higher than 15° C. and a viscosity of not higher than 300 cp selected from the group consisting of triethylene glycol, tetraethylene glycol, pentaethylene glycol, hexaethylene glycol, heptaethylene glycol, and tripropylene glycol in an amount of 1 to 30% by weight based on the porous solid particles.

2. An electro-rheological fluid as set forth in claim 1, wherein the electrically insulating liquid is selected from the group consisting of mineral oils, aromatic hydrocarbons, naphthenic hydrocarbons, poly-α-olefins, polyalkylene glycols, diesters, polyol esters, phosphoric acid esters, silicon compounds, fluorine compounds, halogenated aromatic liquids and polyphenyl ethers.

3. An electro-rheological fluid as set forth in claim 2, wherein the electrically insulating liquid has a viscosity of 5 to 300 cp at 40° C.

4. An electro-rheological fluid as set forth in claim 1, wherein the porous solid particles are selected from the group consisting of silica gel, hydrous resins, diatomaceous earth, alumina, silica-alumina, zeolites, ion exchange resins and celluloses.

5. An electro-rheological fluid as set forth in claim 4, wherein the porous solid particles have a particle size of 10 nm to 200 μm.

6. An electro-rheological fluid as set forth in claim 1, wherein the porous solid particles are contained in an amount of 0.1 to 50% by weight based on the entire fluid.

7. An electro-rheological fluid as set forth in claim 1, which further comprises at least one member selected from the group consisting of acids, bases and salts.

8. An electro-rheological fluid as set forth in claim 7, wherein the acid is selected from the group consisting of sulfuric acid, hydrochloric acid, nitric acid, perchloric acid, chromic acid, phosphoric acid, acetic acid, formic acid, propionic acid, butyric acid, isobutyric acid, valeric acid, oxalic acid and malonic acid.

9. An electro-rheological fluid as set forth in claim 7, wherein the base is selected from the group consisting of NaOH, KOH, Ca(OH)$_2$, Na$_2$CO$_3$, NaHCO$_3$, K$_3$PO$_4$, Na$_3$PO$_4$, aniline, alkylamines and ethanolamines.

10. An electro-rheological fluid as set forth in claim 7, wherein the salt is selected from the group consisting of LiCl, NaCl, KCl, MgCl$_2$, BaCl$_2$, LiBr, NaBr, KBr, MgBr, LiI, NaI, KI, AgNO$_3$, Ca(NO$_3$)$_2$, NaNO$_2$, NH$_4$NO$_3$, K$_2$SO$_4$, NaHSO$_4$, (NH$_4$)$_2$SO$_4$, and alkali metal salts of formic acid, acetic acid, oxalic acid and succinic acid.

11. An electro-rheological fluid as set forth in claim 7, wherein said at least one member is contained in an amount of 0.01 to 5% by weight based on the entire fluid.

* * * * *